United States Patent [19]

Kamiyama

[11] Patent Number: 5,346,250
[45] Date of Patent: Sep. 13, 1994

[54] INFLATABLE SEAT BELT UNIT

[75] Inventor: Misao Kamiyama, Hikone, Japan

[73] Assignee: Takata Corporation, Tokyo, Japan

[21] Appl. No.: 949,585

[22] Filed: Sep. 23, 1992

[30] Foreign Application Priority Data

Sep. 24, 1991 [JP] Japan .................. 3-243250

[51] Int. Cl.$^5$ .............................. B60R 21/18
[52] U.S. Cl. .................. 280/733; 280/736; 280/737
[58] Field of Search ............... 280/733, 736, 737, 742

[56] References Cited

U.S. PATENT DOCUMENTS

| 3,738,681 | 6/1973 | Wada et al. | 280/733 |
| 3,791,670 | 2/1974 | Lucore et al. | 280/733 |
| 3,801,156 | 4/1974 | Granig | 280/733 |
| 3,874,694 | 4/1975 | Stephenson | 280/737 |
| 3,929,348 | 12/1975 | Lawwill | 280/733 |
| 4,360,223 | 11/1982 | Kirchoff | 280/742 |
| 5,100,171 | 3/1992 | Faigle et al. | 280/736 |

FOREIGN PATENT DOCUMENTS 47-26830 10/1972 Japan .
49-88220 8/1974 Japan .
1-83436 3/1989 Japan ................... 280/733

Primary Examiner—Eric Culbreth
Attorney, Agent, or Firm—Armstrong, Westerman, Hattori, McLeland & Naughton

[57] ABSTRACT

In an inflatable seat belt unit of the present invention, a bag-like belt 2b is maintained in a band-like shape in normal case. When a tongue 5 is engaged in a buckle unit 4 for putting the belt on, a gas flow hole 4a and a gas flow hole 5a are aligned, and a gas flowing passage is formed, while the gas flow hole 4a and the gas flow hole 5a are shut off by caps 11 and 12 in the normal case. Because a gas generator 9 is not operated in the normal case, the inflatable seat belt unit fulfills the function to restrain the occupant in the same manner as the conventional type ordinary seat belt unit. In an emergency, high pressure gas is generated from the gas generator 9, and the generated gas ruptures the caps 11 and 12 and enters the bag-like belt 2b. As the result, the bag-like belt 2b is instantaneously and perfectly inflated and developed, and the occupant can be perfectly received by the inflated and developed bag-like belt 2b.

7 Claims, 6 Drawing Sheets

INFLATABLE SEAT BELT UNIT

BACKGROUND OF THE INVENTION

The present invention relates to an inflatable seat belt unit comprising a webbing, which is formed at least partially in bag-like shape, normally maintained in band-like shape, and inflated and developed by a gas generated by gas generating means in an emergency.

Conventionally, a seat belt unit is provided on a seat of a vehicle, such as automobile in most cases, and the seat belt unit restrains an occupant of the vehicle in an emergency such as vehicle collision and protects him or her from injury caused by collision of car body. In such seat belt unit, however, the width of the webbing of the belt restraining the occupant is not very large, and relatively high local load is applied when the occupant is restrained by the webbing.

To solve the problem, inflatable seat belt units have been proposed, for example, in the Japanese Patent Laid-Open Publications No. 47-26830 or No. 49-88220. In such inflatable seat belt unit, a webbing is formed in bag-like shape, and this is maintained in a band-like shape in the normal case, functioning as an ordinary seat belt. In an emergency, the webbing is inflated by introducing gas injected from a gas generating means into the bag-Like webbing and the occupant is received by the inflated webbing, which serves, thus, as an air belt. In this inflatable seat belt unit, the webbing receives kinetic energy of the occupant over wider area. As the result, the load is dispersed, and a high local Load is not applied on the occupant. This provides more effective protection for the occupant.

When an air bag unit is mounted on a rear seal of the vehicle, similarly to the case where it is mounted for the occupant on front seat, the air bag unit must be mounted on a backside of the front seat in front of the rear seat. However, when the air bag unit is mounted on the front seat, it is difficult to protect the occupant on the rear seat properly and effectively because the front seat is adjusted and displaced in front-back direction by the occupant or it is inclined at different position. For this reason, the inflatable seat belt unit as described above is especially effective when it is mounted on rear seat.

In the seat belt unit as disclosed in the above patent publications, a tongue is slidably mounted on the webbing by passing the inflated webbing through a hole of the tongue. When such tongue is used, the webbing does not fit well the occupant when the webbing is twisted or inversed, and smooth movement of the tongue to the webbing may be hindered. Accordingly, the belt through-hole of the tongue must be designed in such size that the webbing is not twisted or inversed. As the result, the size of the: hole is limited.

When the size of the belt through-hole for the tongue is limited, inflation of the webbing is suppressed by the tongue when the gas from the gas generating means is introduced into the bag-like webbing in an emergency and the webbing is inflated. As the result, the introduced gas does not smoothly flow to the portion of the webbing ahead of the tongue, i.e. the portion of the webbing, which contacts the occupant, and this contact portion of the webbing may not be inflated rapidly and perfectly in some cases. In general, the webbing is folded at the belt through-hole. This means that gas flow area is not large enough, and smooth movement of gas is further hindered.

If the contact portion of the webbing is not inflated rapidly and perfectly, the load due to kinetic energy of the occupant is dispersed by the webbing. As the result, the function of the air belt for preventing the application of high local load on the occupant may not be fulfilled reliably and sufficiently.

The tongue is slidably mounted on the inflated webbing, but the inflated webbing is formed in bag-like shape and is hence relatively thick. Thus, it is difficult to move the tongue smoothly, and maneuverability of the tongue is not always satisfactory.

SUMMARY OF THE INVENTION

It is an object of the present invention to provide an inflatable seat belt unit with a high maneuverability, by which it is possible to inflate an inflatable webbing reliably and rapidly in an emergency.

To attain the objects of the invention, the inflatable seat belt unit of the present invention comprises a webbing, of which at least a part of a portion contacting an occupant is formed in bag-like shape, said bag-like portion being maintained in band-like shape in normal case and inflated and developed by gas from gas generating means in an emergency, a tongue connected to the bag-like portion of the webbing, and a buckle unit, to which the tongue is removably inserted and engaged, and it is characterized in that said buckle unit is provided with a buckle side gas flow hole communicated with said gas generating means, said tongue provided with a tongue side gas flow hole communicated with said bag-like portion, and when said tongue is inserted and engaged in said buckle unit, said buckle side gas flow hole and said tongue side gas flow hole are communicated with each other, and a gas flowing passage is formed, which communicates said gas generating means with said bag-like portion of said webbing.

Also, the present invention is characterized in that said buckle unit is provided with a buckle side cap for closing said buckle side gas flow hole in a normal case and for opening said buckle side gas flow hole in an emergency after being ruptured by said gas, and further, said tongue is provided with a tongue side cap for closing said tongue side gas flow hole in the normal case and for opening said tongue side gas flow hole in an emergency after being ruptured by said gas.

Further, the present invention is characterized in that a filter for preventing intrusion of foreign objects into said bag-like portion of said webbing is mounted in said tongue side gas flow hole.

In the inflatable seat belt unit of the present invention, with such an arrangement, when the tongue is inserted and engaged in the buckle unit, the buckle side gas flow hole and the tongue side gas flow hole are communicated with each other, and a gas flowing passage is formed, which communicates the gas generating means with the bag-like portion of the webbing. In an emergency, the gas generated by the gas generating means passes through this gas flowing passage and enters the bag-like portion of the webbing. As the result, the webbing is instantaneously and perfectly inflated and developed.

Because the tongue does not slide over and rub the bag-like portion of the webbing, the tongue can be easily handled, and this results in satisfactory maneuverability.

Because the buckle side gas flow hole and the tongue side gas flow hole are closed by the caps respectively in the normal case, the intrusion of foreign objects into the buckle side gas flow hole and the tongue side gas flow hole is prevented even when the tongue and the buckle unit are not engaged with each other. In an emergency, the cap is ruptured instantaneously by gas and a gas flowing passage is formed, and the gas is reliably introduced into bag-like portion of the webbing. Therefore, the bag-like portion of the webbing can be instantaneously and perfectly inflated and developed.

Further, because a filter is mounted on the tongue side gas flow hole in the present invention, foreign objects such as residues generated during gas generation or cap fragments can be caught by the filter. This prevents intrusion of the foreign objects into the bag-like portion of the webbing, and the webbing can be protected from the influence of the foreign objects.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

In the following, description will be given on the embodiments of the present invention in connection with the drawings.

Figure 1:
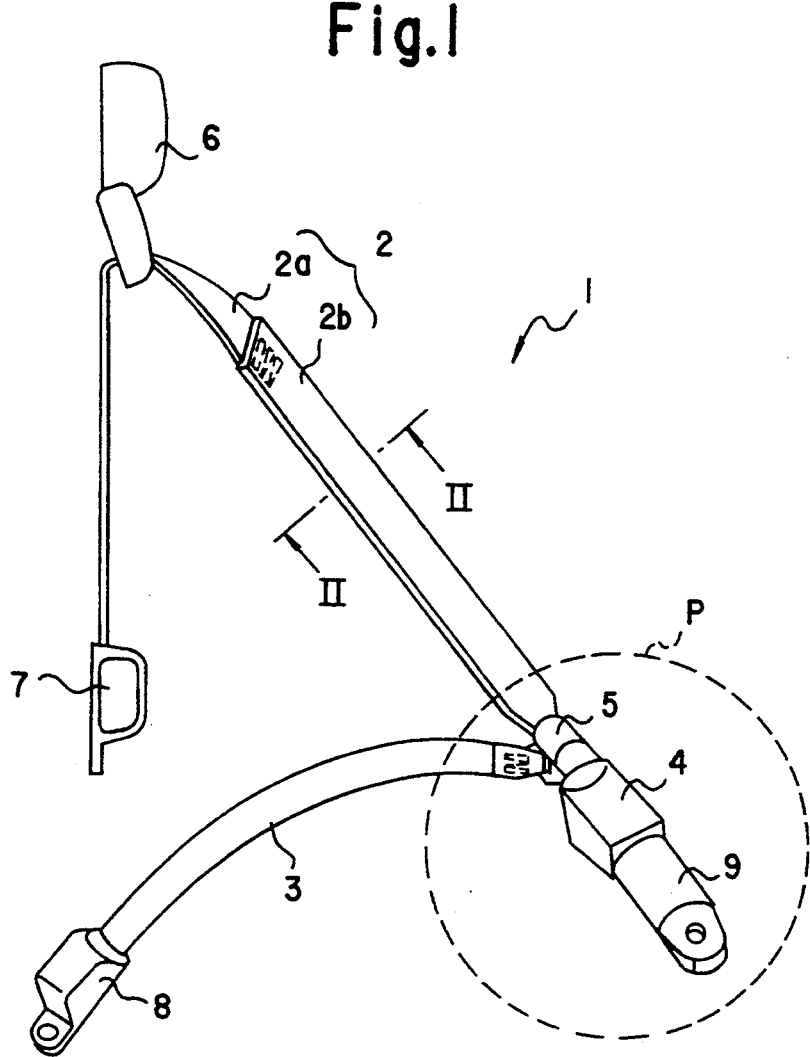
FIG. 1 is a general view of an embodiment of an inflatable seat belt unit of the present invention.

As shown in FIG. 1, the inflatable seat belt unit 1 of the present embodiment comprises a shoulder belt 2 stretched from either left side or right side (right side of the occupant in the figure) to the other side diagonally in up-down direction, a lap belt 3 stretched from either left side or right side (right side of the occupant in the figure) to the other side, a buckle unit 4 mounted on the car body or on the floor, a tongue 5 inserted and engaged in the buckle unit 4 when the belt is put on, and an intermediate guide 6 for guiding the shoulder belt 2.

The shoulder belt 2 comprises a normal belt 2a similar to a conventional type ordinary seat belt and a bag-like belt 2b connected to one end of the normal belt 2a. The normal belt 2a is slidably guided by the intermediate guide 6, and the other end of it is connected to a seat belt retractor (ELR) 7 fixed on car body. By this seat belt retractor 7, the normal belt 2a is wound up to a predetermined extent. By passing the normal belt 2a through the intermediate guide 6 and by taking it up by the retractor 7, the shoulder belt 2 can be smoothly taken up or pulled out, and slack of the belt can be easily and reliably absorbed.

The bag-like belt 2b is placed at a position to contact the occupant, and its end opposite to the connecting end to the normal belt 2a is connected to the tongue 5. Thus, when the bag-like belt 2b is directly connected with the tongue 5, the length of the bag-like belt 2b can be easily set because the buckle unit 4 is always at the same position.

The lap belt 3 is made of the same normal belt as a conventional type of general seat belt. One end of it is connected to the tongue 5, and the other end is connected to the seat belt retractor (ELR) 8 fixed on car body.

Further, in the buckle unit 4, a gas generator (G.G.) 9 for generating high pressure gas in an emergency such as vehicle collision is connected.

Figure 2:
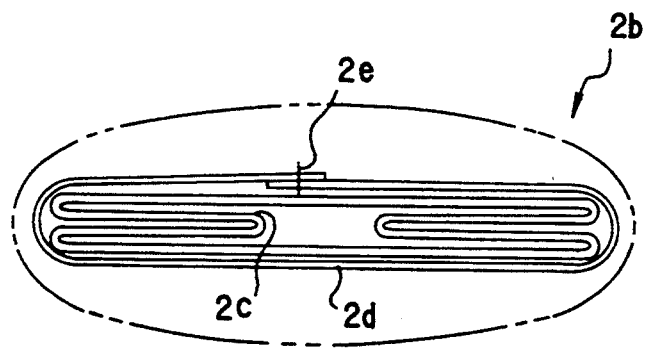
FIG. 2 is a cross-sectional view of the embodiment of FIG. 1 along the line II—II.

In the bag-like belt 2b of the shoulder belt 2, the bag-like belt main body 2c is folded as shown by solid lines in FIG. 2 and is covered with a cover 2d. By sewing both ends of the cover 2d, it is maintained in band-like shape in the normal case. This cover 2d is designed in such a manner that, when reaction gas is introduced from the gas generator 9, the sewn portion 2e is easily disengaged by the inflating force of the shoulder belt 2 without hindering inflation of the shoulder belt 2. In this case, the bag-like belt 2b is perfectly inflated and developed as shown by two-dot chain line. To maintain band-like shape of the bag-like belt 2b, folded portion may be lightly bonded together by bonding agent or by the other appropriate means. The connection between the normal belt 2a and the bag-like belt 2b of the shoulder belt 2 and the connection between the bag-like belt 2b and the tongue 5 are maintained in air-tight conditions respectively.

Figure 3:
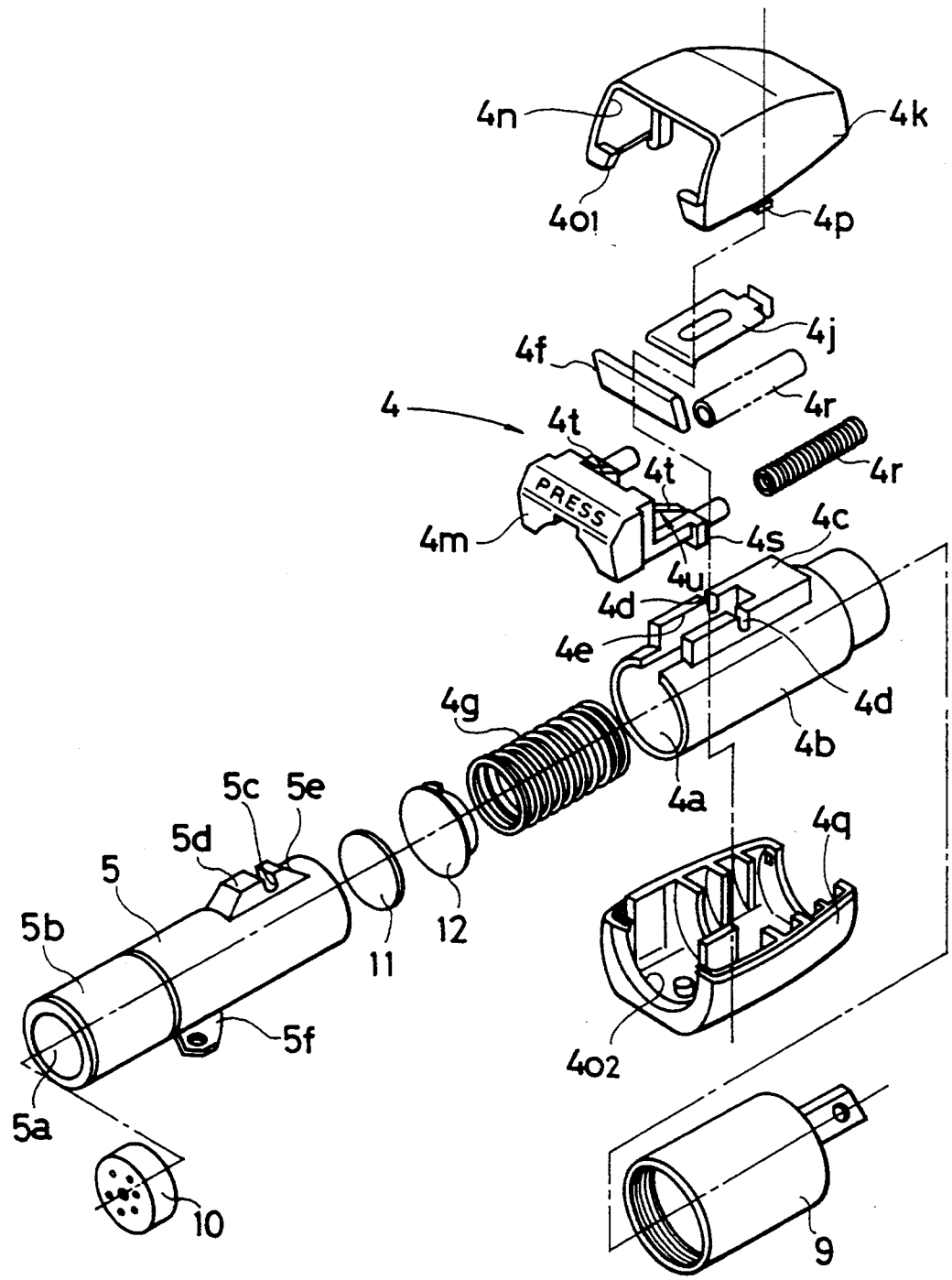
FIG. 3 is an exploded perspective view of a tongue and a buckle unit in the embodiment, taken from an enlargement of the portion P in FIG. 1.

As shown in FIG. 3, the tongue 5 is formed in cylindrical shape with a gas flow hole 5a, of which the bag-like belt 2b is to be connected on one end 5b. On the other end of the tongue 5, an engaging section 5d with a groove 5c to engage with a pawl (shown by 4f in FIG. 3) is furnished. The other end of the engaging section 5d has an inclined surface 5e. Approximately at the center of the tongue 5, a connection 5f is formed, to which the lap belt 3 is to be connected.

Figure 4A:
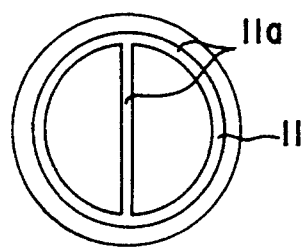
FIGS. 4(a) and 4(b) show caps for closing a gas flow hole of the tongue and the buckle unit of this embodiment.

In the gas flow hole 5a of the tongue 5, a filter 10 is held by cap on one end 5b, and a tongue side cap 11 (shown in detail in FIG. 5) is furnished on the other end. The filter 10 cools down heat of the gas flowing toward the bag-like belt 2b and prevents intrusion of foreign objects into the bag-like belt 2b. The tongue side cap 11 is provided with a notched groove 11a as shown in FIG. 4(a). In normal case, the cap 11 closes tightly the gas flow hole 5a of the tongue 5 and prevents intrusion of foreign objects into the gas flow hole 5a. When gas is generated in an emergency, the cap is easily ruptured along the notched groove 11a by gas pressure, and a gas flowing passage is opened.

The tongue 5 is formed in cylindrical shape and is designed in compact form because there is no need to form the gas flow hole 5a in large size. This makes it easier to insert and remove the tongue to and from the buckle unit 4.

As shown in FIG. 3, the buckle unit 4 comprises a cylindrical buckle main body 4b with a gas flow hole 4a. From one end of the buckle main body 4b, the other end of the tongue 5 is engaged in the gas flow hole 4a. On the other end of the buckle main body 4b, a gas generator 9 is engaged and fixed. Further, a projection 4c is formed outer periphery of the buckle main body 4b. A groove 4d to engage with and stop a paul 4f formed in a direction perpendicular to axial direction is provided on this projection 4c. On the projection and the buckle main body 4b, a groove 4e engageable with the engaging section 5d of the tongue 5 is formed along axial direction.

Figure 5A:
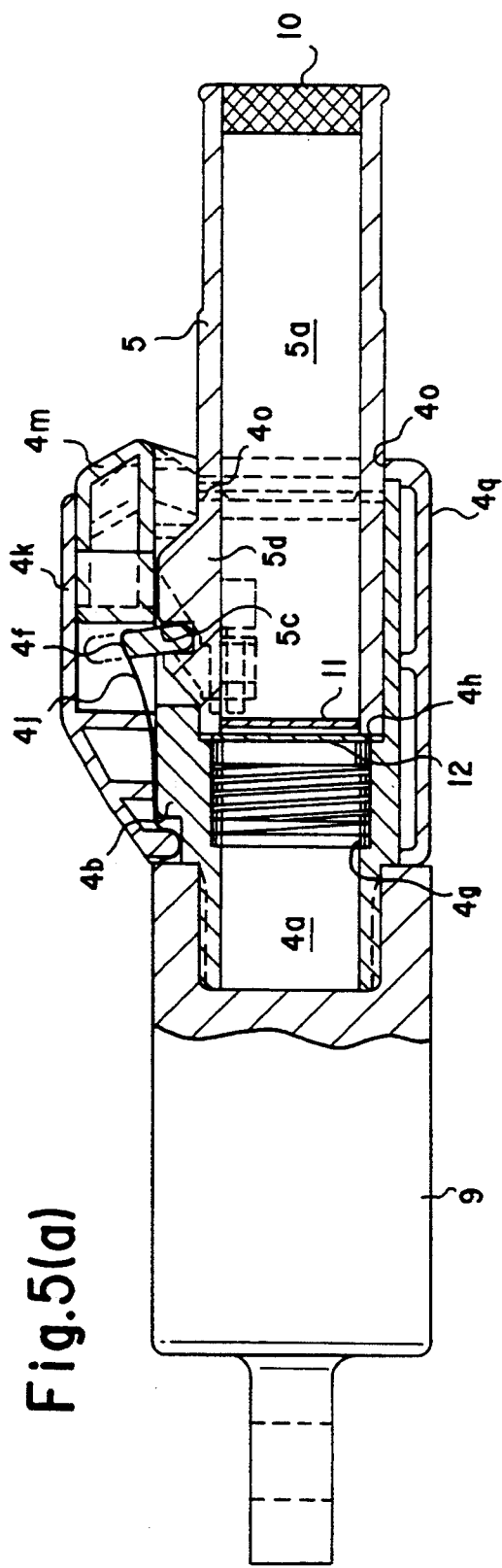
FIGS. 5(a) and 5(b) shown the tongue and the buckle unit connected with each other, where 4(a) is a front view with partial cross-section, and 4(b) is a side view.
Figure 5B:
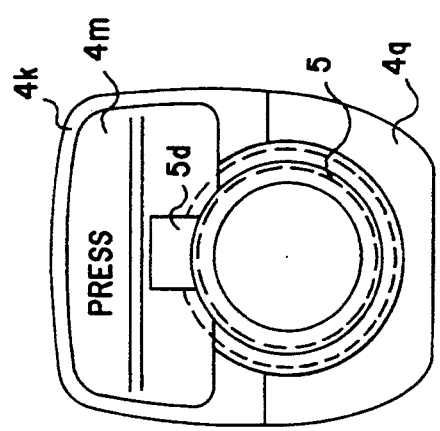

As shown in FIG. 3 and FIGS. 5(a) and 5(b), a spring 4g for pushing the tongue 5, inserted into the gas flow hole 4a, in withdrawing direction is arranged in the gas flow hole 4a of the buckle main body 4b. On one end of the spring 4g, a buckle side cap 12 is mounted. This buckle side cap 12 can be slidably moved between the position where the tongue is not inserted in the gas flow hole 4a and the spring 4g is in free state and the position where the tongue 5 is inserted into the gas flow hole 4a and pushed and is brought into contact with a graded step 4h of the gas flow hole 4a.

Figure 4B:
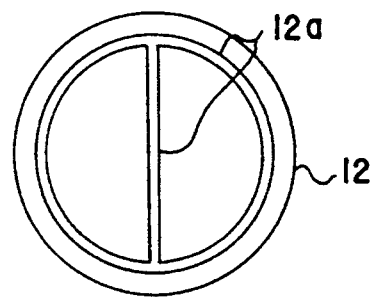

The buckle side cap 12 is provided with a notched groove 12a as shown in FIG. 4(b). In normal case, this cap 12 closes the gas flow hole 4a of the buckle main body 4b and prevents intrusion of foreign objects into the gas flow hole 4a beyond the cap 12 toward the gas generator 9. When gas is generated in an emergency, the cap is easily ruptured along the notched groove 12a by gas pressure to open a gas flowing passage.

As shown in FIG. 5(a), the pawl 4f is inserted into the groove 4d, and the pawl 4f is always pushed toward inserting direction into the groove 4d by a spring 4j made of flat spring. As the result, when the tongue 5 is inserted into the gas flow hole 4a of the buckle main body 4b, the pawl 4f is pushed up against resilient force of the spring 4j along the inclined surface 5e on the engaging section 5d of the tongue 5 as the tongue moves in axial direction. When the tongue is brought into contact with the graded step 4h of the gas flow hole 4a through the buckle side cap 12, the groove 5c in the engaging section 5d of the tongue 5 is aligned with the groove 4d of the buckle main body 4b, and the pawl 4f is inserted and engaged in the groove 5c by resilient force of the spring 4j. When the pawl 4f is engaged with the groove 5c, the tongue 5 cannot be withdrawn from the buckle main body 5b. One end of the spring 4j is squeezed between an upper cover 4k of the buckle unit 5 and the projection 4c.

As shown in FIG. 3, the upper cover 4k is provided with an opening 4n, into which an operating button 4m is inserted, and a part $4o_1$ of an opening $4o$ shown in FIG. 5, into which the tongue 5 is inserted. Also, the upper cover 4k is provided with a stop nail 4p. When the upper cover 4k is engaged with a lower cover 4q, this stop nail 4p is received by a receiver (not shown) of the lower cover 4q, and the cover to enclose the buckle main body 4b is formed. The lower cover 4q is provided with the other portion $4o_2$ of the opening $4o$, into which the tongue 5 is inserted. When the upper cover 4k and the lower cover 4q are engaged with each other, one circular opening $4o$ is formed.

The operating button 4m is retreatably inserted into the opening 4n of the upper cover 4k, and it is always pushed in a direction to project from the opening 4n by a pair of coil springs 4r furnished between the upper cap 4k and the lower cap. In this case, stop projections 4s provided on both sides of the operating button 4m are received by the receiver (not shown) furnished at a predetermined position of the upper cap 4k so that the extent of projection of the operating button 4m is limited. The position where thee stop projection 4s is received by the receiver of the upper cap 4k is the non-operating position of the operating button 4m as shown by solid line in FIG. 5(a).

On the operating button 4m, a pair of lifting beams 4u with inclined surfaces 4t for the pawl 4f are formed one each on left and right. The inclined surfaces 4t of the lifting beams 4u come below the pawl 4f when the operating button 4m moves in axial direction. When the operating button 4m is pushed toward the position shown by two-dot chain line with the tongue 5 and the buckle unit 4 connected with each other as shown in FIG. 5(a), the inclined surfaces 4t are brought into contact with lower end of the pawl 4f as the operating button 4m moves in axial direction, and the pawl 4f is lifted upward. As the result, the pawl 4f is disengaged from the grooves 4d and 5c, and the engagement of the tongue 5 with the buckle unit 4 is released.

In the inflatable seat belt unit 1 of the present embodiment with the above arrangement, the bag-like belt 2b is maintained in band-like shape in normal case. When the buckle unit 4 and the tongue 5 are not engaged, the gas flow hole 4a of the buckle unit 4 is closed by the cap 12, and the gas flow hole 5a of the tongue 5 is closed by the cap 11, and this prevents the intrusion of foreign objects toward the gas generator 9 and the bag-like belt 2b.

The occupant puts the belt on by sitting on the seat and by inserting and engaging the tongue 5 into the buckle unit 4. When the belt is put on, the pawl 4f is inserted and engaged in the groove 5c. Thus, the tongue 5 is not. disengaged from the buckle unit 4, and the connection of the tongue 5 with the buckle unit 4 is maintained. When the tongue 5 and the buckle unit 4 are connected with each other, the gas flow hole 4a and the gas flow hole 5a are aligned to form a gas flowing passage. In normal case, however, the gas flow hole 4a and the gas flow hole 5a are shut off by the caps 11 and 12.

Further, when the belt is put on, the shoulder belt 2 and the lap belt 3 are pushed by weak force toward take-up direction by the seat belt retractors 7 and 8 respectively. Because this weak force does not give impact on the occupant and take-up reels of the seat belt retractors 7 and 8 are not locked, the two belts 2 and 3 can be freely pulled out. This makes it possible to pull out and store the shoulder belt 2 and the lap belt 3, following the normal movement of the occupant, and this provides better comfortability of the seat belt.

When deceleration of a predetermined magnitude is exerted as the vehicle is running, the occupant tends to move forward by inertia and pushes the two belts 2 and 3. As the result, the two belts 2 and 3 tend to be pulled out from the seat belt retractors 7 and 8 respectively. However, deceleration detecting means of the seat belt retractors 7 and 8 are operated and the take-up reels are locked. Thus, the two belts 2 and 3 are hindered from being pulled out. Therefore, the occupant is perfectly restrained by the shoulder belt 2 and the lap belt 3, and forward movement of the occupant is prevented. In this case, the shoulder belt 2 is adjusted to come to the correct position on the occupant by the intermediate guide 6. In this way, the inflatable seat belt unit 1 of the present embodiment fulfills the function to restrain the occupant in the same manner as the conventional type seat belt unit.

In an emergency such as vehicle collision when very high deceleration occurs on the vehicle, deceleration detecting means on the vehicle are operated. Then, the gas generator 9 is operated, and high pressure gas is generated. With reference to FIGS. 4(*a*) and 4(*b*) the generated gas is instantaneously introduced into the gas flow hole 4*a* of the buckle unit 4 and collides with the buckle side cap 12, and the cap 12 is ruptured. As the result, a gas flowing passage is formed, and the gas collides further with the tongue side cap 11, and the cap 11 is also ruptured. As the result, the gas flow hole 4*a* of the buckle unit 4 and the gas flow hole 5*a* of the tongue 5 are communicated with each other. The gas generator 9 is directly communicated with the bag-like belt 2*b* of the shoulder belt 2, and a gas flowing passage is formed between the gas generator 9 and the bag-like belt 2*b*. Then, the gas generated from the gas generator 9 enters the bag-like belt 2*b*. The cover 2*d* is removed, and the bag-like belt 2*b* is inflated and developed almost instantaneously and perfectly. In this case, the bag-like belt 2*b* is not folded back, and sufficiently large gas flow area is maintained. The gas is introduced instantaneously into the bag-like belt 2*b*, and this increases efficiency of the gas. Because foreign objects such as residues from gas reaction in the gas generator or fragments of the caps 11 and 12 are caught by the filter 10, this prevents intrusion of foreign objects into the bag-like belt 2*b*.

Therefore, the occupant is perfectly received by the inflated and developed bag-like belt 2*b*. Because the bag-like belt 2*b* is expanded and kinetic energy of the occupant is received over wide area, the load is dispersed, and the occupant is protected from high impact load. Because slack of the shoulder belt 2 is absorbed by inflation and development of the bag-like belt 2*b*, the occupant can be restrained by the belt with a high efficiency.

When the operating button 4*m* is pressed to release the engagement between the tongue 5 and the buckle unit 4, the pawl 4*f* is lifted and disengaged from the grooves 4*d* and 5*c*, and the engagement between the tongue 5 and the buckle unit 4 is released. Because the tongue 5 is pushed in a withdrawing direction by the spring 4*g*, the tonge 5 is easily disengaged from the buckle unit 4.

Figure 6:
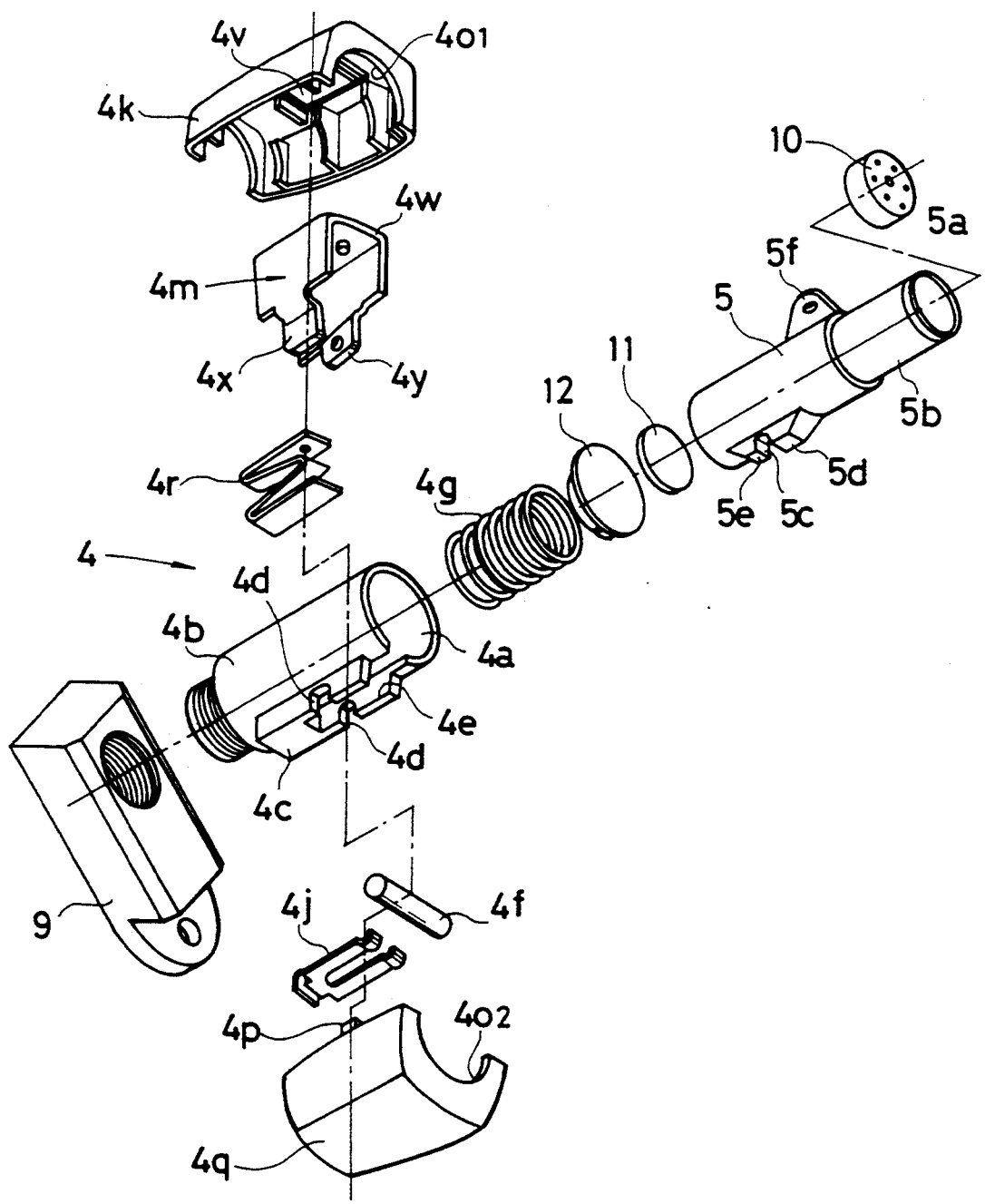
FIG. 6 is an exploded perspective view of the tongue and the buckle unit similar to FIG. 3, of another embodiment of the present invention.

FIG. 6 is a perspective view similar to FIG. 3, showing another embodiment of the invention. The same component as in the above embodiment is referred by the same symbol, and detailed description is not given here.

Figure 7:
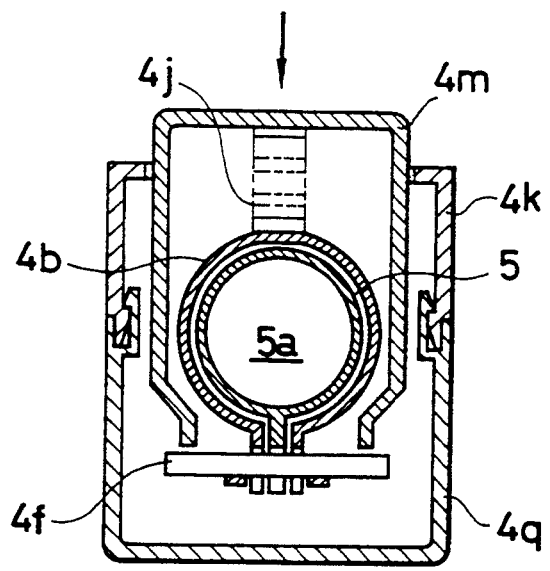
FIG. 7 is a cross-sectional view of this embodiment with the tongue and the buckle unit connected to each other.

In the above embodiment, the operating button 4*m* is operated in a axial direction to release the engagement of the tongue 5 with the buckle unit 4, while the operating button 4*m* is operated in a direction perpendicular to the axial direction in the present embodiment. Specifically, the operating button 4*m* of the present embodiment is formed in an inverted U-shape with a rectangular cross-section. As is evident from FIG. 7, this operating button 4*m* is always pushed upward by a spring 4*j* arranged between the operating button 4*m* and the buckle main body 4*b*, and its head 4*w* passes through an opening 4*v* of the upper cover 4*k* and projects upward. The buckle main body 4*b* is inserted between side walls of the operating button 4*m*. On lower ends of the two side walls, pawl pushers 4*x* and 4*y* for pushing the pawl 4*f* downward are provided when the operating button 4*m* is pushed downward.

The pawl 4*f* is always pushed upward by the spring 4*j* and is inserted into the groove 4*d* of the buckle main body 4*b*. Similarly, when the tongue 5 is inserted to a predetermined extent into the gas flow hole 4*a* of the buckle main body 4*b*, the pawl 4*f* is inserted into the groove 5*c* of the tongue 5 by resilient force of the spring 4*j*. When the pawl 4*f* is inserted into the groove 5*c*, the tongue 5 and the buckle unit 4 cannot be separated as in the case of the above embodiment, and the engagement of the tongue 5 with the buckle unit 4 is maintained.

By pushing the operating button 4*m* downward, the pawl pushers 4*x* and 4*y* of the operating button 4*m* push the pawl 4*f* downward and disengage it from the groove 5*c*. As a result, the engagement of the tongue 5 with the buckle unit 4 can be released.

The other arrangement, actions and effects of the inflatable seat belt unit 1 of the present embodiment are the same as those of the above embodiment, and detailed description is not given here.

Figure 8:
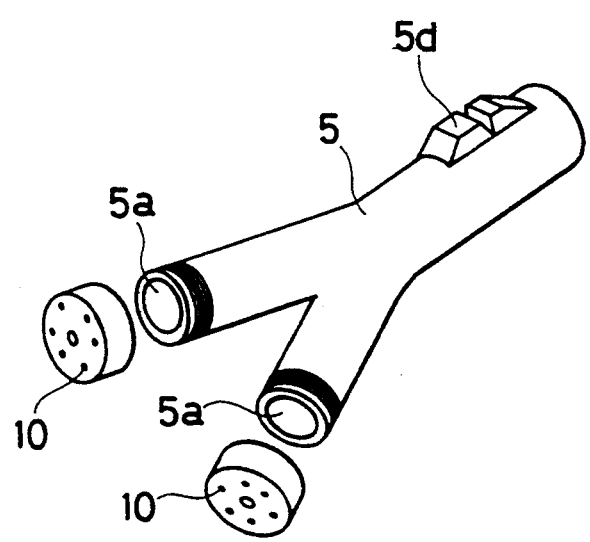
FIG. 8 is a perspective view of a variant of a tongue used in the inflatable seat belt unit of the present invention.

The present invention is not limited to the above embodiments and various design changes and modifications can be made. For example, the tongue 5 is provided only with the gas flow hole 5*a* communicated with the bag-like belt 2*b* of the shoulder belt 2 in the above embodiment, while the gas flow hole 5*a* in the tongue 5 may be formed in fork type as shown in FIG. 8, and the lap belt 3 may be formed in bag-like belt, or the gas flow hole 5*a* may also be communicated with the bag-like belt of the lap belt 3 in addition to the bag-like belt 2*b* of the shoulder belt 2. In so doing, it is possible to further increase the effect of the air belt, and to protect the occupant more effectively.

In the above embodiments, the gas flow holes 4*a* and 5*a* have circular cross-section, whereas cross-section of the gas flow holes 4*a* and 5*a* may be in any other form.

As it is evident from the above description, it is possible according to the inflatable seat belt unit of the present invention to perfectly introduce the gas into the bag-like portion of the webbing in an emergency because a gas flowing passage is formed for communicating the gas generating means and the bag-like portion of the webbing when the tongue is inserted and engaged in the buckle unit. Therefore, the webbing can be instantaneously and perfectly inflated and developed. Because the tongue does not slide over and rub the bag-like portion of the webbing, the tongue can be handled much more easily, and this improves the maneuverability of the tongue.

Further, because the buckle side gas flow hole and the tongue side gas flow hole are closed by caps respectively in a normal case, the intrusion of foreign objects into the buckle side gas flow hole and the tongue side gas flow hole can be effectively prevented.

Additionally, because a filter is provided on the tongue side gas flow hole, foreign objects can be caught by the filter when the gas is introduced into the bag-like portion of the webbing. Because foreign objects do not enter the bag-like portion of the webbing, the webbing can be protected from the influence of foreign objects.

What we claim is:

1. An inflatable seat belt unit, comprising:
   an elongated belt for restraining an occupant in a vehicle;
   at least a portion of said elongated belt being formed in a bag-shape;
   said bag-shape portion being maintained, in a normal case, in a generally flat shape;

gas generating means for inflating said bag-shape portion in an emergency;

a tongue connected to an end of said elongated belt;

a buckle unit capable of being fixed to the vehicle;

said tongue being removably insertable and engageable with said buckle unit;

said buckle unit is provided with a buckle side gas flow hole which communicates with said gas generating means;

said tongue is provided with a tongue side gas flow hole which communicates with said bag-shape portion;

when said tongue is in an inserted and engaged state with said buckle unit said buckle side gas flow hole and said tongue side gas flow hole communicate with each other and a gas flowing passage is formed which communicates said gas generating means with said bag-shape portion of said belt;

wherein said buckle unit is provided with a buckle side cap which is constructed to close said buckle side gas flow hole during said normal case and which is constructed to open said buckle side gas flow hole in an emergency after being ruptured by gas released from said gas generating means, and further said tongue is provided with a tongue side cap which is constructed to close said tongue side gas flow hole during said normal case and which is constructed to open said tongue side flow hole in an emergency after being ruptured by said gas; and wherein a filter is provided in said tongue side gas flow hole, said filter preventing intrusion of foreign objects into said bag-shape portion of said belt.

2. An inflatable seat belt according to claim 1, where said tongue is inserted along a linear axis into said buckle unit, and wherein said gas flow hole extends along said axis within said tongue, said tongue connecting to said end of said elongated belt at an end of said tongue which is attached to an opening in said belt axially aligned at the end of said elongated belt.

3. An inflatable seat belt according to claim 2, wherein said axis is generally along a straight line.

4. An inflatable seat belt unit according to claim 1, wherein said filter is located in said tongue proximate to said end of said elongated belt, and said filter is located on a side of both said caps downstream of said gas generating means.

5. An inflatable seat belt unit according to claim 1, wherein said buckle side cap and said tongue side cap are each provided with frangible notch groove portions.

6. An inflatable seat belt unit according to claim 1, wherein said elongated belt includes a normal belt portion connected to said bag-shape portion on a side of said bag-shape portion opposite said tongue, said normal belt portion extending to a seat belt retraction means for retracting the elongated belt.

7. An inflatable seat belt unit according to claim 6, wherein said normal belt portion extends through an intermediate guide, and said elongate seat belt extends upwardly across a chest of an occupant in the vehicle.

* * * * *